United States Patent
Shinde et al.

(10) Patent No.: US 10,387,240 B2
(45) Date of Patent: Aug. 20, 2019

(54) SYSTEM AND METHOD FOR MONITORING AND MEASURING APPLICATION PERFORMANCE USING APPLICATION INDEX

(71) Applicant: AVEKSHAA TECHNOLOGIES PRIVATE LTD, Bangalore (IN)

(72) Inventors: Ashutosh Shashank Shinde, Bangalore (IN); Rajinder Gandotra, Bangalore (IN)

(*) Notice: Subject to any disclaimer, the term of this patent is extended or adjusted under 35 U.S.C. 154(b) by 195 days.

(21) Appl. No.: 15/231,570

(22) Filed: Aug. 8, 2016

(65) Prior Publication Data

US 2017/0046243 A1 Feb. 16, 2017

(30) Foreign Application Priority Data

Aug. 12, 2015 (IN) .............................. 685/CHE/2015

(51) Int. Cl.
*G06F 11/30* (2006.01)
*G06F 11/34* (2006.01)
*G06F 21/50* (2013.01)
*G06F 11/07* (2006.01)

(52) U.S. Cl.
CPC ........ *G06F 11/0793* (2013.01); *G06F 11/079* (2013.01); *G06F 11/0709* (2013.01); *G06F 11/0715* (2013.01); *G06F 11/3495* (2013.01); *G06F 11/3476* (2013.01); *G06F 2201/86* (2013.01)

(58) Field of Classification Search
CPC .......... G06F 11/30; G06F 11/34; G06F 21/50; H04L 43/00
See application file for complete search history.

(56) References Cited

U.S. PATENT DOCUMENTS

| | | | |
|---|---|---|---|
| 9,697,545 B1* | 7/2017 | Hermany | H04L 43/065 |
| 9,753,796 B2* | 9/2017 | Mahaffey | G06F 11/0766 |
| 2014/0024348 A1* | 1/2014 | Hurst | H04M 3/5232 455/414.1 |
| 2015/0019715 A1* | 1/2015 | Ronen | H04W 24/08 709/224 |
| 2016/0094431 A1* | 3/2016 | Hall | H04L 43/16 709/224 |
| 2018/0077224 A1* | 3/2018 | Moon | H04L 67/10 |

* cited by examiner

*Primary Examiner* — Shirley X Zhang
(74) *Attorney, Agent, or Firm* — Barry Choobin; Patent 360

(57) ABSTRACT

A system and method for measuring the performance of an application using an index is presented. The system includes a plurality of computing devices, an application performance monitoring module, a consumer data center, a customer IT development center. The plurality of computing devices capable of communicating with a communication network. The computing devices are incorporated with a plurality of applications. The application monitoring module configured to extract information from a plurality of computing devices and generate a performance index. The performance index is generated by using the formula: QoS index=(Satisfactory samples+0.5*tolerating samples+0*frustrated samples−α*interactions before application crash−β*buffering instances on the communication network).

17 Claims, 2 Drawing Sheets

SYSTEM AND METHOD FOR MONITORING AND MEASURING APPLICATION PERFORMANCE USING APPLICATION INDEX

CROSS REFERENCE TO RELATED APPLICATIONS

Benefit is claimed under 35 U.S.C. 119(a)-(d) to Foreign application Serial No. 685CHE/2015 filed in India entitled "SYSTEM AND METHOD FOR BUSINESS-IT PREDICTABILITY AND ASSURANCE PLATFORM", on Feb. 12, 2015 and subsequently postdated by 6 months to Aug. 12, 2015, which is herein incorporated in its entirety by reference for all purposes.

BACKGROUND

Technical Field

The embodiments herein are generally related to data monitoring and analysis. The embodiments herein are particularly related to monitoring and measuring application performance in computing devices like mobile phone, tablets based on iOS, Android, and windows based phones. The embodiments herein are more particularly related to monitoring and measuring application performance in computing devices using an index.

Description of the Related Art

Advances in technology have allowed users to use a plurality of third-party applications on a computing device in our daily life activities and also for critical activities. These third-party applications support users need for information, communication and leisure. The examples of the third-party applications include a native mobile application, a default application by a manufacturer, a browser-based application, a standalone application, and the like.

The performance of the third-party application depends on a plurality of factors such as location, demography, network usage, type of device, version of the operating system, and the like. The performance of the third-party applications is monitored for efficient and effective usage of the applications.

Hence, there is a need for a system and method for efficient and effective monitoring and analysis of the application performance of the third-party applications and the device health. Further, there is a need for a system and method for measuring, monitoring, and analysis of the application performance using an index value. Still further, there is a need for a system and method for presenting the monitored and analyzed result along with the generated index on a dashboard.

The above-mentioned shortcomings, disadvantages, and problems are addressed herein and which will be understood by reading and studying the following specification.

OBJECTS OF THE EMBODIMENTS HEREIN

The primary object of the embodiments herein is to provide a system and method for monitoring and analyzing the performance of an application.

Another object of the embodiment herein is to provide a system and method to generate an index for measuring the performance of an application.

Yet another object of the embodiment herein is to display the results of the generated index on a dashboard in a customized way.

Yet another object of the embodiments herein is to provide a scalable and efficient application performance management application.

Yet another object of the embodiments herein is to predict device health and subsequent application performance based on the measured parameters.

These and other objects and advantages of the embodiments herein will become readily apparent from the following detailed description taken in conjunction with the accompanying drawings.

SUMMARY

The embodiments herein provide a system and method for measuring the performance of an application using an index. The system includes a plurality of computing devices, an application performance monitoring module, a consumer data center, a customer IT development center.

The plurality of computing devices capable of communicating with a communication network. The computing devices are incorporated with a plurality of applications.

The application monitoring module configured to extract information from a plurality of computing devices and generate a performance index. The performance index is generated by using the formula: (Satisfactory samples+ 0.5*tolerating samples+0*frustrated samples− $\alpha$*interactions before application crash−$\beta$*buffering instances on the communication network). The satisfactory samples refer to samples where a quality of service for the application is satisfactory and tolerating samples refers to samples where the quality of service of the application is tolerable and frustrated samples refers to samples where the quality of the service of the application is dissatisfactory. The quality of service is measured by using a pre-determined threshold, and $\alpha$ and $\beta$ are constants that are optionally configurable by a user of the computing device. Further, the application monitoring module presents the generated performance index on a dashboard of the application monitoring system.

According to an embodiment herein, the formula represents the interactions in a session when the crash occurs and also the constant $\alpha$ is a weighted constant value which is decided based on the business importance of the crashed transaction and also $\alpha$ is a percentage which generally results in a multiple less than 0.99. Further, anything above the 0.99 results in the index rounded off to zero.

According to an embodiment herein, the $\beta$ is only applicable in the case of streaming applications and is also a weighted average of buffering instances, which are based on the severity of the buffering, resulting in a number less than 0.99. Further, when the $\beta$ value is less than zero or below zero of app index will be founded off to zero.

The consumer data center includes a plurality of application servers. According to an embodiment herein, the consumer data center is communicably coupled with the application monitoring module and are configured to provide information about a plurality of applications. The information is provided using a plurality of server agents located on the application servers.

The customer IT development module configured to receive information from the application development module and to analyze the generated index for increasing the efficiency of the application performance.

According to an embodiment herein, the computing devices is selected from a group consisting of a mobile phone, a smartphone, a laptop, a wearable device, a virtual reality device, a smart television, a point-of-service device, an automated teller device, and an internet-of-things device.

According to an embodiment herein, the information transmitted to the application monitoring module includes a device information, battery information, battery temperature, an operating system information, video player information, network information, buffering information, signal strength information, applications on the device information, location information, usage of communication network, and metadata of the computing device.

According to an embodiment herein, the results presented on the dashboard of the application monitoring system further includes an aggregation of a historic performance index over a period.

According to an embodiment herein, the application monitoring module further includes a recommendation module for recommending a plurality of actions when the measured performance index is below a pre-determined threshold. The determined threshold is determined by a concerned personnel of the application monitoring module.

According to an embodiment herein, the application monitoring unit displays the determined application performance index on the computing device of the user.

According to an embodiment herein, the application performance monitoring module communicates with the customer IT development module, the customer data center, and the plurality of computing devices through the communication network. The communication network includes an intranet, the internet, a telecommunication network, a radio-frequency network, a local area network, a wide area network, a metropolitan area network, a wired network, and a wireless network.

According to an embodiment herein, the dashboard of the application monitoring module includes a plurality of filters for measuring the application performance index, where the plurality of filters include location based filtering, application based filtering, device-based filtering, and network-based filtering.

According to an embodiment herein, the plurality of computing device transmits the information through a plurality of applications, wherein the plurality of applications is selected from a group consisting of a native application, a default application, and a third-party application.

The various embodiments herein provide a computer-implemented method for measuring the performance of an application using an index. The method includes detecting a plurality of computing device, extracting a plurality of data from the plurality of computing devices, generating a performance index for one or more applications, displaying the generated performance index on a dashboard of the application monitoring module, and recommending one or more actions on the dashboard of the application performance module.

According to an embodiment herein, the plurality of computing devices located at various locations are detected using a communication network.

The performance index is generated by using the formula: (Satisfactory samples+0.5*tolerating samples+0*frustrated samples−$\alpha$*interactions before application crash−$\beta$*buffering instances on the communication network). The satisfactory samples refer to samples where a quality of service for the application is satisfactory and tolerating samples refers to samples where the quality of service of the application is tolerable and frustrated samples refers to samples where the quality of the service of the application is dissatisfactory. The quality of service is measured by using a pre-determined threshold, and $\alpha$ and $\beta$ are constants that are optionally configurable by a user of the computing device. Further, the application monitoring module presents the generated performance index on a dashboard of the application monitoring system.

According to an embodiment herein, the formula represents the interactions in a session when the crash occurs and also the constant $\alpha$ is a weighted constant value which is decided based on the business importance of the crashed transaction and also $\alpha$ is a percentage which generally results in a multiple less than 0.99. Further, anything above the 0.99 results in the index rounded off to zero.

According to an embodiment herein, the $\beta$ is only applicable in the case of streaming applications and is also a weighted average of buffering instances, which are based on the severity of the buffering problem, resulting in a number less than 0.99. Further, when the $\beta$ value is less than zero or below zero of app index will be rounded off to zero.

The display includes an aggregated historic performance index and a prediction of the subsequent performance index, and the performance index is predicted based on the historical data and a plurality of pre-determined parameters.

The recommendation provided to improve the application performance is based on the historical data, artificial intelligence, and machine learning techniques.

According to an embodiment herein, the generated performance index is communicated to a customer development module for deriving analysis and feedback for further increasing the accuracy of the generated application performance index.

According to an embodiment herein, the performance index is displayed on a user interface of the user's computing device.

According to an embodiment herein, the information from the plurality of devices are extracted when the computing device is involved in performing the non-intensive work such as a cursory operation. Typically the data from the computing devices are extracted as a background operation and the device's resource is not wasted to a great extent. Further, the data from the plurality of applications are extracted without affecting the performance of the computing device and the application installed on the device.

According to an embodiment herein, the plurality of the data extracted from the plurality of the computing device includes a device information, battery information, battery temperature, an operating system information, video player information, network information, signal strength information, applications on the device information, location information, usage of communication network, response time, buffering time, user behavior profile, and metadata of the computing device.

According to an embodiment herein, a method is provided for collecting application performance data in the development lifecycle, performance testing and in production. The collected application performance data in the development lifecycle is used in a production environment during issue resolution, performance evaluation and root cause analysis.

These and other aspects of the embodiments herein will be better appreciated and understood when considered in conjunction with the following description and the accompanying drawings. It should be understood, however, that the following descriptions, while indicating the preferred embodiments and numerous specific details thereof are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The other objects, features, and advantages will occur to those skilled in the art from the following description of the preferred embodiment and the accompanying drawings in which.

Although the specific features of the embodiments herein are shown in some drawings and not in others. This is done for convenience only as each feature may be combined with any or all of the other features in accordance with the embodiments herein.

DETAILED DESCRIPTION OF THE INVENTION

In the following detailed description, reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

The embodiments herein provide a system and method for measuring the performance of an application using an index. The system includes a plurality of computing devices, an application performance monitoring module, a consumer data center, a customer IT development center.

The plurality of computing devices capable of communicating with a communication network. The computing devices are incorporated with a plurality of applications.

The application monitoring module configured to extract information from a plurality of computing devices and generate a performance index. The performance index is generated by using the formula: (Satisfactory samples+ 0.5*tolerating samples+0*frustrated samples− $\alpha$*interactions before application crash−$\beta$*buffering instances on the communication network). The satisfactory samples refer to samples where a quality of service for the application is satisfactory and tolerating samples refers to samples where the quality of service of the application is tolerable and frustrated samples refers to samples where the quality of the service of the application is dissatisfactory. The quality of service is measured by using a pre-determined threshold and $\alpha$ and $\beta$ are constants that are optionally configurable by a user of the computing device. Further, the application monitoring module presents the generated performance index on a dashboard of the application monitoring system.

According to an embodiment herein, the formula represents the interactions in a session when the crash occurs and also the constant $\alpha$ is a weighted constant value which is decided based on the business importance of the crashed transaction and also $\alpha$ is a percentage which generally results in a multiple less than 0.99. Further, anything above the 0.99 results in the index rounded off to zero.

According to an embodiment herein, the $\beta$ is only applicable in the case of streaming applications and is also a weighted average of buffering instances, which are based on the severity of the buffering problem resulting in a number less than 0.99. Further, when the $\beta$ value is less than zero or below zero of app index will be rounded off to zero.

The consumer data center includes a plurality of application servers. According to an embodiment herein, the consumer data center is communicably coupled with the application monitoring module and are configured to provide information about a plurality of applications. The information is provided using a plurality of server agents located on the application servers.

The customer IT development module configured to receive information from the application development module and to analyze the generated index for increasing the efficiency of the application performance.

According to an embodiment herein, the computing devices is selected from a group consisting of a mobile phone, a smartphone, a laptop, a wearable device, a virtual reality device, a smart television, a point-of-service device, an automated teller device, and an internet-of-things device.

According to an embodiment herein, the information transmitted to the application monitoring module includes a device information, battery information, battery temperature, an operating system information, video player information, network information, buffering information, signal strength information, applications on the device information, location information, usage of communication network, and metadata of the computing device.

According to an embodiment herein, the results presented on the dashboard of the application monitoring system further includes an aggregation of a historic performance index over a period.

According to an embodiment herein, the application monitoring module further includes a recommendation module for recommending a plurality of actions when the measured performance index is below a pre-determined threshold. The pre-determined threshold is determined by a concerned personnel of the application monitoring module.

According to an embodiment herein, the application monitoring unit displays the determined application performance index on the computing device of the user.

According to an embodiment herein, the application performance monitoring module communicates with the customer IT development module, the customer data center, and the plurality of computing devices through the communication network. The communication network includes an intranet, the internet, a telecommunication network, a radiofrequency network, a local area network, a wide area network, a metropolitan area network, a wired network, and a wireless network.

According to an embodiment herein, the dashboard of the application monitoring module includes a plurality of filters for measuring the application performance index, where the plurality of filters include location based filtering, application based filtering, device-based filtering, and network-based filtering.

According to an embodiment herein, the plurality of computing device transmits the information through a plurality of applications, wherein the plurality of applications is selected from a group consisting of a native application, a default application, and a third-party application.

The various embodiments herein provide a computer-implemented method for measuring the performance of an application using an index. The method includes detecting a plurality of computing device, extracting a plurality of data from the plurality of computing devices, generating a performance index for one or more applications, displaying the generated performance index on a dashboard of the application monitoring module, and recommending one or more actions on the dashboard of the application performance module.

According to an embodiment herein, the plurality of computing devices located at various locations are detected using a communication network. The performance index is generated by using the formula: (Satisfactory samples+ 0.5*tolerating samples+0*frustrated samples− α*interactions before application crash−β*buffering instances on the communication network). The satisfactory samples refer to samples where a quality of service for the application is satisfactory and tolerating samples refers to samples where the quality of service of the application is tolerable and frustrated samples refers to samples where the quality of the service of the application is dissatisfactory. The quality of service is measured by using a pre-determined threshold, and α and β are constants that are optionally configurable by a user of the computing device. Further, the application monitoring module presents the generated performance index on a dashboard of the application monitoring system.

According to an embodiment herein, the formula represents the interactions in a session when the crash occurs and also the constant α is a weighted constant value which is decided based on the business importance of the crashed transaction and also α is a percentage which generally results in a multiple less than 0.99. Further, anything above the 0.99 results in the index rounded off to zero.

According to an embodiment herein, the β is only applicable in the case of steaming applications and is also a weighted average of buffering instances, which are based on the severity of the buffering problem, resulting in a number less than 0.99. Further, when the β value is less than zero or below zero of app index will be rounded off to zero.

The display includes an aggregated historic performance index and a prediction of the subsequent performance index, and the performance index is predicted based on the historical data and a plurality of pre-determined parameters.

The recommendation provided to improve the application performance is based on the historical data, artificial intelligence, and machine learning techniques.

According to an embodiment herein, the generated performance index is communicated to a customer development module for deriving analysis and feedback for further increasing the accuracy of the generated application performance index.

According to an embodiment herein, the performance index is displayed on a user interface of the user's computing device.

According to an embodiment herein, the information from the plurality of devices are extracted when the computing device is involved in performing the non-intensive work such as a cursory operation. Typically, the data from the computing devices are extracted as a background operation and the device's resource is not wasted to a great extent. Further, the data from the plurality of applications are extracted without affecting the performance of the computing device and the application installed on the device.

According to an embodiment herein, the plurality of the data extracted from the plurality of the computing device includes a device information, battery information, battery temperature, an operating system information, video player information, network information, signal strength information, applications on the device information, location information, usage of communication network, response time, buffering time, user behavior profile, and metadata of the computing device.

The various embodiments herein provide a system and method for monitoring application performance and generating an index for the measured performance. Typically, the embodiments herein provide a platform for a plurality of monitoring personnel and also to an end-user for monitoring and measuring the performance of one or more applications available on a computing device. The platform collects data from the computing devices for one or more applications, analyzes the collected data for performance monitoring, and generates an application performance index and presents the same on a dashboard of a monitoring personnel. Further, the platform recommends one or more actions that a concerned personnel may perform when the application performance is poor.

According to an embodiment herein, a method is provided for collecting application performance data in the development lifecycle, performance testing and in production. The collected application performance data in the development lifecycle is used in a production environment during issue resolution, performance evaluation and root cause analysis.

Figure 1:
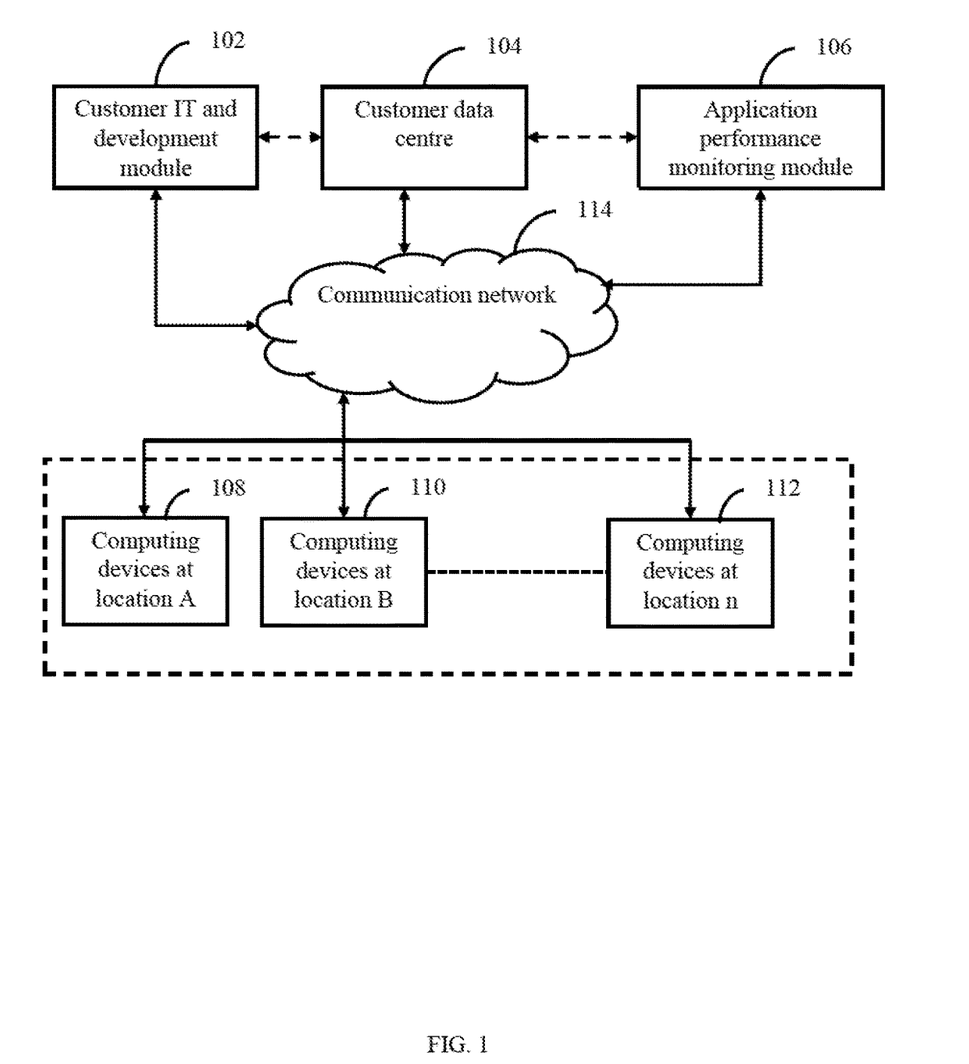
FIG. 1 illustrates a block diagram illustrating the system for generating application performance index, according to an embodiment herein.

FIG. 1 illustrates a block diagram illustrating the system for generating application performance index, according to an embodiment herein. The block diagram includes a customer IT and development module 102, a customer data center 104, an application performance monitoring platform 106, a communication network 114, a plurality of computing devices at location-A 108, a plurality of computing devices at location-B 110, and a plurality of computing devices at the location-n 112.

The application performance monitoring platform 106 monitors and measures the application performance of the user devices located at the various locations. For example, the application performance monitoring module 106 monitors the performance of a particular application such as a video player application of a plurality of computing devices at the location-A 108. An index for measuring a quality of service (QoS) for a particular application at a particular location is generated by the performance monitoring module 106. The application performance monitoring module 106 measures the performance of a particular application by capturing data from both the computing devices and from a plurality of application servers. The results are then transmitted to the customer IT and development module 102 for feedback and analysis. Based on the improvements suggested by the concerned personnel the application performance monitoring module 106 further increases the efficiency of the QoS index.

According to an embodiment herein, the application performance monitoring module 106 collects data at various levels from the customer data center 104, and the plurality of computing devices i.e. the end user devices located at various location through the communication network 106. The examples of the computing devices include, but are not limited to a smartphone, a laptop, an automated teller machine (ATM), a kiosk, a point-of-sale device, an in-store device, a wearable device, a home automation system, a laptop, a desktop, a smart television, a virtual-reality device, an internet-of-things device, and the like.

The communication network 106 provides communication between a plurality of modules. The examples of the communication network include, but are not limited to an intranet, the internet, a telecommunication network, a radio-frequency network, a local area network, a wide area network, a metropolitan area network, and the like.

The customer data center 104 is a place where the servers of the plurality of applications are located. A plurality of light weight server agents is located at the application server for extracting the relevant data for the performance monitoring and generating index. According to an embodiment herein, the server agent is defined as a system that schedules, processes and automates a plurality of tasks. In accordance with the embodiments herein, the server agents in the application server located at the customer data center 104 schedules and automates processes such as extracting and monitoring response time, buffering status, the health of the application servers, and the like. Further, the lightweight server agent includes a database for storing the extracted and monitored data of a plurality of applications.

The computing devices located at the location-A 108, the computing devices located at the location-B 110 and the computing devices located at location C-112 are the devices that use a plurality of applications from various locations. According to an embodiment herein, a dedicated application is installed on the computing devices for transmitting the relevant data to the application performance management module 106. According to an embodiment herein the computing devices transmit the relevant data to the application performance management module 106 through browsers, with or without dedicated plugins. The computing device 108, 110, and 112 located at various locations derives insights in the form of an index based on the transmitted parameters. Typically, the computing devices which has a native application and a browser plugin installed receives a detailed insight of the performance of the plurality of the applications using the performance index. The computing devices that do not have the dedicated native application and the browser plug-in may not receive a deep insight into the performance of the application.

According to an embodiment herein, a plurality of data is transmitted from the computing device 108, 110, and 112 to the application performance monitoring module 106 at various levels. The data transmitted includes but ere not limited to the type of device, type of network, network type and network strength, the location of the user, type of application, application usage levels, device utilization levels, download timeline, and the like. Further, the application performance monitoring module captures other information from the computing devices 108, 110, and 112 such as streaming parameters, monitoring parameters, user profile parameters, and the like. The examples of the streaming parameters include, but are not limited to buffering time, packet loss and bandwidth time, application and the like. The examples of the monitoring parameters include, but are not limited to CPU utilization, memory utilization, battery utilization, battery percentage, battery temperature, and the like. Furthermore, the information of the computing devices 108, 110, and 112 transmits information including crash reports, exceptions at device levels and at application levels. The extracted information for one or more applications from the computing devices is analyzed for segregating satisfactory samples, tolerated samples, and as frustrated samples.

For example, in a video player application, the satisfactory samples refers to the computing devices at a particular location receiving the optimum quality of the video with negligible or no buffering. The tolerating samples refer to the computing devices at another location receiving video at a buffering level within a pre-determined threshold level. The frustrated samples amount to the computing devices at a location where there are substantial buffering levels and the buffering level is beyond a threshold limit. According to an embodiment herein, the buffering level is measured periodically. The period is set by an administrator of the performance monitoring module 106. For example, the performance is managed for every 10 seconds, 15 seconds, and the like. According to an embodiment herein, the information is collected from the computing devices only when the video player application is buffering.

The application performance monitoring module 106 collects the information of the computing device over the communication network 114 and generates an index known as application performance index or as Quality of Service (QoS) index. The QoS index generated is similar to the Apdex™ index calculated for monitoring and measuring the performance of the web applications.

According to an embodiment herein, the QoS index is calculated using the formula: QoS index=(Satisfactory samples+0.5*tolerating samples+0*frustrated samples−$\alpha$*interactions before application crash−$\beta$*buffering instances on the communication network). The value of $\alpha$ and $\beta$ are configurable from the range of 0.5 to 1 and is generally defined by the user.

According to an embodiment herein, the formula represents the interactions in a session when the crash occurs and also the constant $\alpha$ is a weighted constant value which is decided based on the business importance of the crashed transaction and also $\alpha$ is a percentage which generally results in a multiple less than 0.99. Further, anything above the 0.99 results in the index rounded off to zero.

According to an embodiment herein, the $\beta$ is only applicable in the case of steaming applications and is also a weighted average of buffering instances, which are based on the severity of the buffering problem, resulting in a number less than 0.99. Further, when the $\beta$ value is less than zero or below zero of app index will be rounded off to zero.

According to an embodiment herein, the QoS index is calculated for each application at each location. According to an embodiment herein, the QoS index is calculated for each application at all the locations. According to an embodiment herein, the QoS index is calculated for a plurality of application at each location. The generated index is a numerical value that helps the concerned personnel to determine the quality of the service of one or more applications at a plurality of locations.

Further, the generated QoS index is published at a display unit (not shown in the FIG.) at the application monitoring platform 106. Further, the results are displayed as a continuous graph that allows the concerned personnel to monitor the QoS over a period. The period can be weekly, monthly, quarterly, or yearly. The displayed QoS index allows concerned personnel to quickly view the QoS across various geographies for a particular application and can solve one or more issues before it reaches a critical point. Further, the displayed QoS index also allows the concerned personnel to predict the future performance of the application at one or more locations, and take corrective actions, if necessary.

According to an embodiment herein, the application monitoring platform 106 optionally includes a recommendation engine for recommending corrective actions, when a critical issue is found or predicted. The corrective action is recommended based on a plurality of standard techniques and the historical data.

Further, the generated QoS index is also displayed on the computing device 108, 110, and 112 located at a plurality of locations. The end-users of the computing device 108, 110, and 112 can view the QoS index. The QoS index displayed is also based on the information transmitted from the computing device and hence, the QoS index varies from one device to another.

Figure 2:
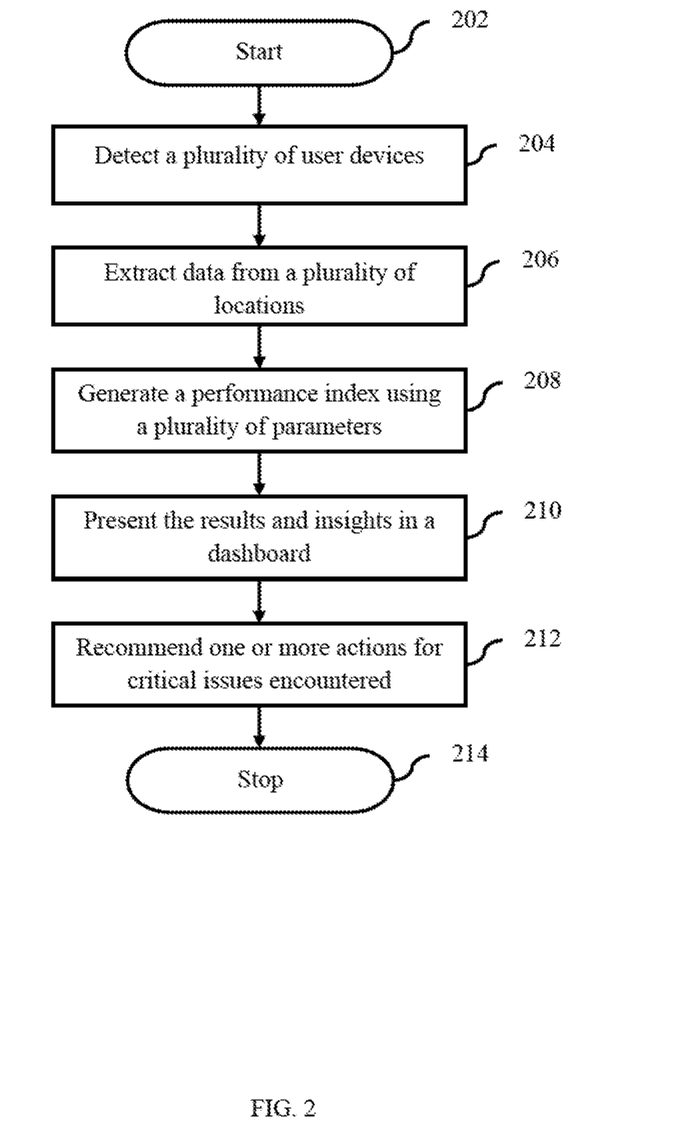
FIG. 2 illustrates a flowchart explaining a method for monitoring the performance of an application and generating an application performance index, according to an embodiment herein.

FIG. 2 illustrates a flowchart explaining a method for monitoring the performance of an application and generating an application performance index, according to an embodiment herein. To monitor the performance of an application is initiated by a performance monitoring module (Step 202).

A plurality of computing devices is detected (Step 204). The plurality of computing devices are detected based on the device identities and the applications installed on the computing device. The devices are detected using the communication network.

Once the computing devices are detected, a plurality of information is collected from the plurality of detected devices (Step 206). The information collected from the plurality of the computing device include, but are not limited to device information, battery information, battery percentage, battery temperature, network quality information, application information, browser information, operating system information, version of the operating system, application crash information, location information, RAM usage information, video player status, buffering information, and the like and the like. The application monitoring platform also collects data from the application servers by deploying lightweight agents to the application servers.

Further, the information received by the plurality of computing devices is segregated into satisfactory samples, tolerant samples, and frustrated samples. The segregation is based on the application performance level measured using a plurality of pre-determined parameters.

The information collected from the plurality of computing devices for a plurality of applications from a plurality of locations is processed for generating a Quality of Service (QoS) index (Step 208). The QoS index is calculated by using the formula: The performance index is generated by using the formula: (QoS) index=(Satisfactory samples+ 0.5*tolerating samples+0*frustrated samples− $\alpha$*interactions before application crash−$\beta$*buffering instances on the communication network). The satisfactory samples refer to samples where a quality of service for the application is satisfactory and tolerating samples refers to samples where the quality of service of the application is tolerable and frustrated samples refers to samples where the quality of the service of the application is dissatisfactory. The quality of service is measured by using a pre-determined threshold, and $\alpha$ and $\beta$ are constants that are optionally configurable by a user of the computing device. Further, the application monitoring module presents the generated performance index on a dashboard of the application monitoring system. The value of $\alpha$ and $\beta$ are configurable from the range of 0.5 to 1 and is generally defined by the user.

According to an embodiment herein, the formula represents the interactions in a session when the crash occurs and also the constant $\alpha$ is a weighted constant value which is decided based on the business importance of the crashed transaction and also $\alpha$ is a percentage which generally results in a multiple less than 0.99. Further, anything above the 0.99 results in the index rounded off to zero.

According to an embodiment herein, the $\beta$ is only applicable in the case of streaming applications and is also a weighted average of buffering instances, which are based on the severity of the buffering problem, resulting in a number less than 0.99. Further, when the $\beta$ value is less than zero or below zero of app index will be rounded off to zero.

The generated QoS index is presented on a dashboard of the performance application monitoring module (Step 210).

Further, the presented results include QoS over a period by aggregating the previous data and are dynamically updated. The concerned personnel has the option to review the presented results and gain deep insights of the index by selecting a drop-down menu available for each application performance at each location. The dashboard also includes searchable digital journeys, where the application usage is tracked for a particular period. The dashboard further includes features such as segregation of errors based on the cause of the crash, event-based notification for customer experience, the number of installs and uninstalls in a stipulated period (day, week, and month), end-to-end transaction tracing, response time prediction, and the like.

According to an embodiment herein, the presented results can also be shared with a customer development team and with the end-users. This allows the customer development team to fix one or more issues. Also, sharing the QoS index with the end-users on their computing device allows them to determine the issue, and report the issue to concerned authorities, if necessary.

Further, the application monitoring platform recommends one or more actions when the QoS index generated is below a threshold (Step 212). The application monitoring platform also generates a prediction of the QoS index for next 24 hours based on the historical data. For example, when a video player application encounters an issue such as not playing video in any of the devices, even when the signal strength is optimum and the device parameters are optimum, the application performance monitoring module raises an alert and notifies the concerned personnel on a priority basis. The application performance monitoring module recommends based on the pre-fed actions and the historical data. Further, the dashboard includes a comparison of QoS of an application at different locations and comparison of QoS of the different applications at the same location.

According to an embodiment herein, the application monitoring platform provides a dashboard at various levels at various access levels. For example, the dashboard results and the action recommended can be different for an administrator, and for an information officer. The dashboard can also be different for a developer and for the customer care executive. However, the QoS index is uniform to all the levels.

Once the QoS is determined, the session is ended temporarily (Step 214). According to an embodiment herein, the application is ended when the user of the computing device ends this process. According to an embodiment herein, the generated QoS is used for determining the health of the application monitored.

According to an embodiment herein, a method is provided for collecting application performance data in the development lifecycle, performance testing and in production. The collected application performance data in the development lifecycle is used in a production environment.

The embodiments herein provide a system and method for detecting slowness in a particular location, slow response time, and buffering and also determine the quality of service of that particular application.

The embodiments herein provide a system and method for measuring the qualify of service index by capturing a plurality of information from the computing device.

The embodiments herein provide a system and method for detecting the root-cause when the computing device does not show the desired quality of service index.

The embodiments herein provide a live monitoring of the performance of a particular application at a particular location.

The embodiments herein provide complete details including crash reports, hits, incidents, overall response, user details, device QoS, and the like.

The embodiments herein also provide information to third-party services such as an external analytics platform to take corrective measures, which will enable the concerned authorities to understand the interaction of the application with the network and the device.

The embodiments herein provide a system and method for capturing user click-path and client side errors automatically, which enables to understand the behavioral profile of the users.

The embodiments herein provide a system and method for providing reports at various levels such as geo-wise performance levels, performance across various devices, and premium user reports.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood tot the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

Although the embodiments herein are described with various specific embodiments, it will be obvious for a person skilled in the art to practice the invention with modifications. However, all such modifications are deemed to be within the scope of the claims.

What is claimed is:

1. A system for measuring performance of an application using an index through one or more algorithms, the system comprising:
    a plurality of computing devices capable of communicating with a communication network, wherein the computing devices are installed with a plurality of applications;
    an application monitoring module run on a hardware processor provided in the system and configured to extract information from a plurality of computing devices and generate a performance index, wherein the performance index is generated by using a preset formula, and wherein the application monitoring module is configured to display the generated performance index on a dashboard of the application monitoring system, and wherein the application monitoring module comprises a recommendation module for recommending a plurality of actions when the measured performance index is less than a pre-determined threshold, and wherein the pre-determined threshold is estimated by the application monitoring module;
    a consumer data center comprising a plurality of application servers, wherein the consumer data center is communicably coupled with the application monitoring module and configured to provide information about a plurality of applications, wherein the information is provided through a plurality of server agents located on the application servers; and
    a customer IT development module run on a hardware processor provided in the system and configured to receive information from an application development module, and wherein the customer IT development module analyses the generated performance index for increasing an efficacy of the application performance; wherein the preset formula is represented as QoS index= (Satisfactory samples+0.5*tolerating samples+0*frustrated samples−a*interactions before application crash−β*buffering instances on the communication network and, wherein a plurality of satisfactory samples refers to samples in which a quality of service for the application is satisfactory and wherein tolerating samples refers to samples in which the quality of service of the application is tolerable and frustrated samples refers to samples, in which the quality of the service of the application is dissatisfactory, and wherein the quality of service is measured by using a pre-determined threshold, and wherein α and β are constants that are optionally configurable by a user of the computing device, and wherein satisfactory samples refer to an application received by the computing devices at a particular location with optimum quality and with negligible or no buffering, and wherein the tolerating samples refer to the application received by the computing devices at another location at a buffering level within a pre-determined threshold level, and wherein the frustrated samples refer to the application received to the computing devices at a location with the buffering level beyond the pre-determined threshold level, and wherein the QoS index is calculated for each application at each location, and wherein the QoS index is calculated for each application at a plurality of locations.

2. The system according to claim 1, wherein the computing devices is selected from a group consisting of a mobile phone, a smartphone, a laptop, a wearable device, a virtual reality device, a smart television, a point-of-service device, an automated teller device, and an internet-of-things device.

3. The system according to claim 1, wherein the information transmitted to the application monitoring module includes a device information, battery information, battery temperature, an operating system information, video player information, network information, signal information, signal strength information, applications on the device information, location information, usage of communication network, and metadata of the computing device.

4. The system according to claim 1, wherein the results displayed on the dashboard of the application monitoring system includes an aggregation of a historic performance index over a period.

5. The system according to claim 1, wherein the application monitoring module is configured to display the estimated application performance index on the computing device of the user.

6. The system according to claim 1, wherein the application monitoring module is configured to communicate with the customer IT development module, the customer data center, and the plurality of computing devices through the communication network, and wherein the communication network includes an intranet, the internet, a telecommunication network, a radio-frequency network, a local area network, a wide area network, a metropolitan area network, a wired network, and a wireless network.

7. The system according to claim 1, wherein the application monitoring module is configured to extract information from the plurality of computing devices are extracted when the computing device is involved in performing the non-intensive work and wherein the non-intensive work is a cursor movement operation.

8. The system according to claim 1, wherein the application monitoring module is configured to collect an application performance data in development lifecycle process, performance testing process and in production process, and wherein the application monitoring module is configured to use the application performance data collected in the development lifecycle in a production environment during issue resolution, performance evaluation, and root cause analysis.

9. The system according to claim 1, wherein the dashboard of the application monitoring module comprises a plurality of filters for measuring the application performance index, and wherein the plurality of filters includes location-based filters, application based filters, device-based filters, and network-based filters.

10. The system according to claim 1, wherein the plurality of computing device transmits the information through a plurality of application, wherein the plurality of applications, wherein the plurality of applications is selected from a group consisting of a native application, a default application, and a third-party application.

11. A computer implemented method comprising instructions stored on a non-transitory computer-readable storage medium and executed on a computing device comprising a hardware processor and a memory for measuring a performance of an application using an index using one or more algorithms, the method comprising the steps of:

detecting a plurality of computing devices by an application monitoring module through an algorithm, and wherein the plurality of computing devices are detected using a communication network, and wherein the plurality of computing devices are located at a plurality of locations;

extracting a plurality of data from the plurality of locations by the application monitoring module for one or more applications through an algorithm, and wherein the data is extracted using the communication network;

generating a performance index for one or more applications by the application monitoring module through an algorithm using a preset formula, and wherein the present formula is represented by QoS index=(Satisfactory samples+0.5*tolerating samples+0*frustrated samples−a*interactions before application crash−β*buffering instances on the communication network, wherein a plurality of satisfactory samples refers to samples in which a quality of service for the application is satisfactory, and wherein tolerating samples refers to samples in which the quality of service of the application is tolerable, and wherein the frustrated samples refers to samples in which the quality of the service of the application is dissatisfactory, and wherein the quality of service is measured by using a pre-determined threshold, and wherein α and β are constants that are optionally configurable by a user computing device, and wherein satisfactory samples refer to an application received by the computing devices at a particular location with optimum quality and with negligible or no buffering, and wherein the tolerating samples refer to the application received by the computing devices at another location at a buffering level within a pre-determined threshold level, and wherein the frustrated samples refer to the application received by the computing devices at a location with the buffering level beyond the pre-determined threshold level, and wherein the QoS index is calculated for each application at each location, and wherein the QoS index is calculated for each application at a plurality of locations;

displaying the generated performance index on a dashboard of the application monitoring module, wherein the displayed performance index includes an aggregated historic performance index and a predicted subsequent performance index, and wherein the subsequent performance index is predicted based on the historical data and a plurality of pre-determined parameters; and recommending one or more actions on the dashboard of the application performance module by a recommendation module using an algorithm, and wherein the recommendation is based on the historical data, artificial intelligence, and machine learning techniques, and wherein the application monitoring module comprises a recommendation module for recommending a plurality of actions when the measured performance index is less than a pre-determined threshold, and wherein the pre-determined threshold is estimated by the application monitoring module.

12. The method according to claim 11, wherein the data is extracted from a plurality of application servers of the applications monitored.

13. The method according to claim 11, further comprises communicating the dashboard results with a customer development module for deriving analysis and feedback for further increasing an accuracy of the generated application performance index.

14. The method according to claim 11 further comprises displaying the performance index of the application on a user interface of the computing device.

15. The system according to claim 1, further comprises extracting information from the plurality of computing devices with the application monitoring module, when the computing device is involved in performing the non-intensive work and wherein the non-intensive work is a cursor movement operation.

16. The system according to claim 11, further comprises collecting an application performance data in development lifecycle process, performance testing process and in the production process with the application monitoring module, and wherein the application performance data collected in the development lifecycle is used in a production environment during issue resolution, performance evaluation and root cause analysis.

17. The method according to claim 11, wherein the plurality of the data extracted from the plurality of the computing device includes a device information, battery information, battery information, battery temperature, an operating system information, video player information, network information, signal strength information, applications on the device information, location information, usage of communication network, response time, buffering time, user behavior profile, and metadata of the computing device.

* * * * *